(12) United States Patent
Kuzniak et al.

(10) Patent No.: US 10,212,839 B2
(45) Date of Patent: Feb. 19, 2019

(54) RISK REDUCTION OF ELECTRICAL HAZARDS

(71) Applicant: B.S.A.F.E. MANUFACTURING INCORPORATED, Oldcastle (CA)

(72) Inventors: Theodore R. Kuzniak, Essex (CA); James B. Erwied, Essex (CA); Michael H. Kramer, Oakville (CA); Todd R. Kuzniak, Belle River (CA); Gary J. Masse, LaSalle (CA); Joseph E. Zaleski, LaSalle (CA)

(73) Assignee: B.S.A.F.E. MANUFACTURING INCORPORATED, Oldcastle (CA)

( * ) Notice: Subject to any disclaimer, the term of this patent is extended or adjusted under 35 U.S.C. 154(b) by 8 days.

(21) Appl. No.: 15/444,717

(22) Filed: Feb. 28, 2017

(65) Prior Publication Data

US 2017/0265315 A1 Sep. 14, 2017

Related U.S. Application Data

(60) Provisional application No. 62/389,755, filed on Mar. 9, 2016.

(51) Int. Cl.
*H05K 7/14* (2006.01)
*G08B 3/10* (2006.01)
*G08B 21/18* (2006.01)

(52) U.S. Cl.
CPC ............ *H05K 7/1432* (2013.01); *G08B 3/10* (2013.01); *G08B 21/185* (2013.01)

(58) Field of Classification Search
CPC ... H02J 7/0047; H04B 5/0037; G08B 29/185; G08B 3/10; G08B 21/185; H05K 7/1497;
(Continued)

(56) References Cited

U.S. PATENT DOCUMENTS 4,423,336 A * 12/1983 Iverson .................... H01H 3/26
307/64
5,642,256 A * 6/1997 Pugh .................... H02B 11/133
200/50.02

(Continued)

OTHER PUBLICATIONS

Eaton, "Thinking outside the "big" box—Enhanced safety through isolation of line side power", 2 pages, Mar. 2016.

*Primary Examiner* — Adam B Dravininkas
(74) *Attorney, Agent, or Firm* — Christopher P. Maiorana, PC

(57) ABSTRACT

An apparatus includes an enclosure, a power switch, a cable actuator, a power converter and a manual switch. The enclosure may be mechanically attachable to an external side of an industrial control panel. The power switch may be configured to switch electrical power. The cable actuator may be configured to control the power switch and may have an end connectable to a power disconnect handle of the industrial control panel. The power switch may be open while the power disconnect handle is in an off position and closed while the power disconnect handle is in an on position. The power converter may be configured to generate low-voltage power from the electrical power. The manual switch may be configured to switch the electrical power from a line side of the power switch to the power converter. A wire may transfer the low-voltage power through at least one aperture.

20 Claims, 13 Drawing Sheets

(58) Field of Classification Search
CPC .. H05K 9/0062; H05K 5/0247; H05K 7/1495; H05K 7/202; H05K 7/20754; H05K 7/2079; H05K 5/0021; H05K 5/0208; H05K 5/0217; H05K 5/0239; H05K 5/0017
See application file for complete search history.

(56) References Cited

U.S. PATENT DOCUMENTS

| | | | | |
|---|---|---|---|---|
| 5,986,211 | A | 11/1999 | Greer et al. | 174/61 |
| 7,348,510 | B1* | 3/2008 | Foley | H01H 9/22 |
| | | | | 200/293 |
| 7,462,792 | B1* | 12/2008 | Hellmers | H01H 9/26 |
| | | | | 200/50.33 |
| 7,724,507 | B2 | 5/2010 | Whitt et al. | 361/679.04 |
| 8,720,724 | B1* | 5/2014 | Lynn, IV | H05K 5/03 |
| | | | | 109/49.5 |
| 2005/0036248 | A1* | 2/2005 | Klikic | H02J 9/062 |
| | | | | 361/42 |
| 2005/0224323 | A1* | 10/2005 | Bortolloni | H01H 9/22 |
| | | | | 200/50.05 |
| 2007/0132458 | A1 | 6/2007 | Allen, Jr. | 324/523 |
| 2008/0055846 | A1* | 3/2008 | Clidaras | G06F 1/20 |
| | | | | 361/679.41 |
| 2008/0094782 | A1* | 4/2008 | Mason | H02B 11/127 |
| | | | | 361/609 |
| 2009/0021925 | A1* | 1/2009 | Heimann | H05K 7/186 |
| | | | | 361/818 |
| 2010/0110616 | A1 | 5/2010 | Edel | 361/642 |
| 2010/0208433 | A1* | 8/2010 | Heimann | H04Q 1/10 |
| | | | | 361/724 |
| 2013/0026856 | A1 | 1/2013 | Grindeland | 307/328 |
| 2013/0279049 | A1* | 10/2013 | Van Fossen | B60L 11/1825 |
| | | | | 361/42 |
| 2016/0241114 | A1* | 8/2016 | Cullen | H02K 11/28 |

\* cited by examiner

RISK REDUCTION OF ELECTRICAL HAZARDS

This application relates to U.S. Provisional Application No. 62/389,755, filed Mar. 9, 2016, which is hereby incorporated by reference in its entirety.

FIELD OF THE INVENTION

The invention relates to industrial control power distribution generally and, more particularly, to a method and/or apparatus for implementing risk reduction of electrical hazards.

BACKGROUND

Per the North American workplace electrical safety standards published by the National Fire Protection Association and the Canadian Standards Association, a conventional industrial control panel is considered energized until validated to be de-energized. The validation is completed using an adequately rated voltage detector. Depending on a risk category of the installation being serviced, personal protection equipment of varying degrees is worn by an electrical worker to complete the validation as the validation involves the electrical worker being within a prohibited approach boundary of the electrical hazard.

After a main power disconnect switch has been opened and a load side circuit confirmed de-energized, a top area of the main power disconnect switch inside the industrial control panel is still energized. With a door of the industrial control panel open, the presence of live conductors exposes the electrical worker to potential electrocution and arc-flash hazards. In such a case, the appropriate personal protection equipment should be worn the entire time the panel is being worked on by the electrical worker. The personal protection equipment for typical industrial installations is expensive, cumbersome and time consuming to don.

It would be desirable to implement a method and/or apparatus for implementing risk reduction of electrical hazards.

SUMMARY

The invention concerns an apparatus including an enclosure, a power switch, a cable actuator, a power converter and a manual switch. The enclosure may be mechanically attachable to an external side of an industrial control panel. The power switch may be configured to switch electrical power. The cable actuator may be configured to control the power switch and may have an end connectable to a power disconnect handle of the industrial control panel. The power switch may be open while the power disconnect handle is in an off position and closed while the power disconnect handle is in an on position. The power converter may be configured to generate low-voltage power from the electrical power. The manual switch may be configured to switch the electrical power from a line side of the power switch to the power converter. A wire may transfer the low-voltage power through at least one aperture.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a method and/or apparatus for implementing risk reduction of electrical hazards that may (i) reduce a risk of shock and arc-flash hazards, (ii) reduce a risk of shock and arc-blast hazards, (iii) augment existing industrial control panels, (iv) provide low-voltage power inside the industrial control panel, (v) provide interlocks of the doors and/or (vi) be implemented in one or more housings.

Embodiments of the invention generally provide an isolated control panel (or enclosure) attachable to a common industrial control panel. The isolated control panel may allow an interior of the industrial control panel to be de-energized of all potentially-lethal electrical power. The de-energization of the interior of the industrial control panel generally eliminates shock hazards and adds a second line and a third line of defense against arc-flash and/or arc-blast hazards.

The isolated control panel may allow employers to formulate realistic electrical safety policies and procedures for qualified employees accessing the industrial control panel. The isolated control panel may also provide relevant worker safety while maximizing plant operational efficiency and further assists the employer in making sound hazard assessments at each installation. The de-energization of the industrial control panel may simplify work practices to prevent electric shock and/or other injuries resulting from either direct or indirect electrical contacts. In many instances, the isolated control panel, as part of a complete company electrical safety policy and procedure, may provide enough adequate risk reduction of a particular installation as to lower the level of personal protection equipment used by the qualified employee when entering the locked out industrial control panel.

Figure 1:
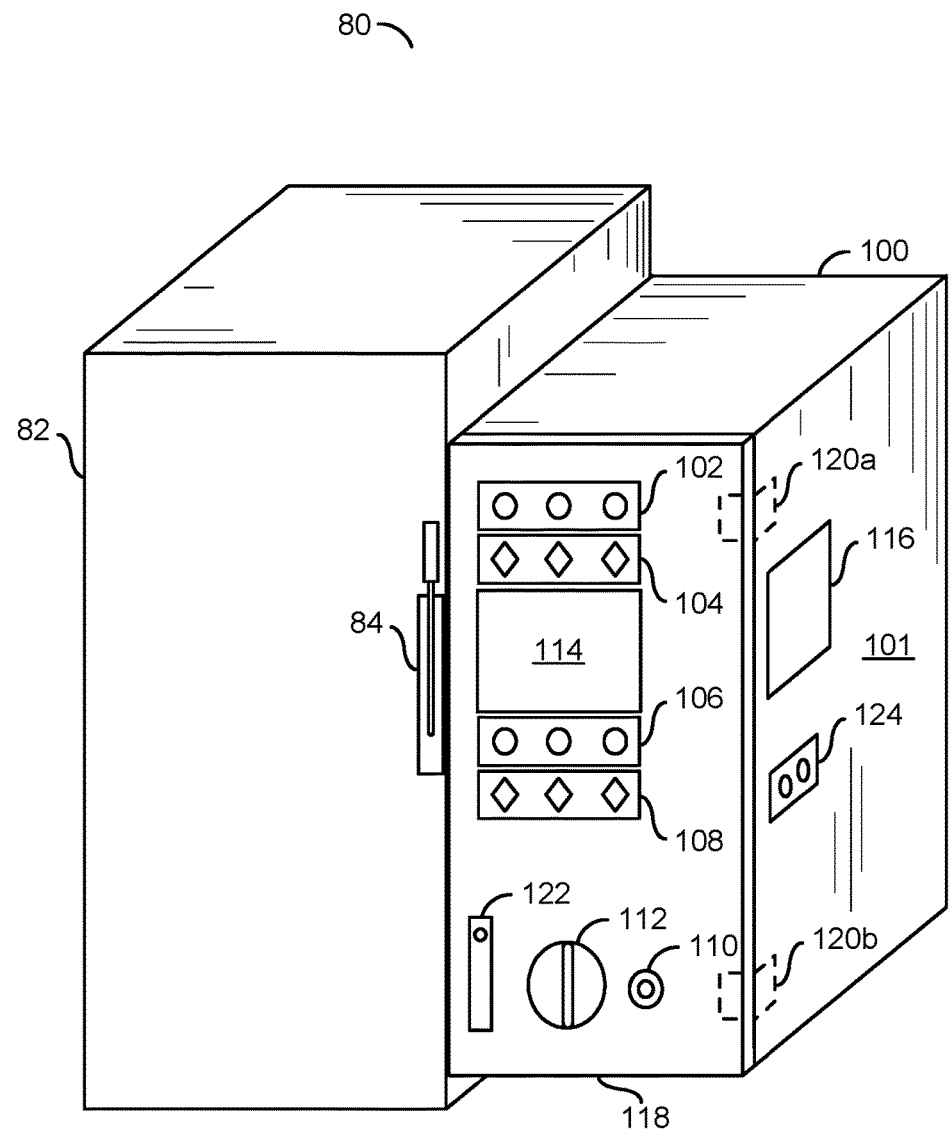
FIG. 1 is a diagram of a system.

Referring to FIG. 1, a diagram of a system 80 is shown. The system (or apparatus) 80 generally comprises an enclosure (or housing) 82 and an enclosure (or housing) 100. The enclosure 82 may implement a common industrial control panel. The enclosure 100 may implement an isolated control panel. The isolated control panel 100 may be mechanically attachable to an external side of the industrial control panel 82.

The industrial control panel 82 may be operational to switch and/or route high-voltage electrical power (e.g., 575 volts AC three-phase power) from an input source to one or more external loads. The industrial control panel 82 generally comprises a handle (or lever) 84 mounted on a front of the industrial control panel 82. The handle 84 may implement a main power disconnect handle having an "on" position and an "off" position. The main power disconnect handle 84 may include a typical interlock mechanism that prevents a door of the industrial control panel 82 from opening while the main power disconnect handle 84 is in the "on" position. The interlock mechanism may allow the door of the industrial control panel 82 to be manually opened while the main power disconnect handle 84 is in the "off" position.

The isolated control panel 100 generally comprises an enclosure (or housing) 101 and a door 118. The enclosure 101 generally comprises multiple indicators (or lights) 102, multiple test points (or stations) 104, multiple indicators (or lights) 106, multiple test points (or stations) 108, an indicator (or light) 110, a lever (or switch) 112, a window 114, an optional window 116, multiple hinges 120a-120b, a lever (or handle) 122 and one or more blocks (or circuits) 124.

The enclosure 101 may implement a rectangular-shaped box. The enclosure 101 may be configured to house various components and provide mechanical protection against electrical shock hazards, arc-flash hazards and/or arc-blast hazards. The enclosure 101 may be fabricated of an electrically conductive material (e.g., steel) and is electrically connected to the industrial control panel 82 for grounding purposes. In various embodiments, the enclosure 101 may be several feet tall (e.g., 46 inches), by approximately a foot wide (e.g., 15 inches) and approximately a foot deep (e.g., 12 inches). Other dimensions may be implemented to meet the design criteria of a particular application.

The indicators 102 may implement multi-phase (e.g., three-phase) line-side voltage indicators. Each line-side voltage indicator 102 may be operational to illuminate while electrical power is present on a corresponding line-side power supply line. If electrical power is absent from any one or more of the line-side power supply lines, the corresponding line-side voltage indicator 102 may be dark. In some embodiments, the line-side voltage indicators 102 may be mounted in the door 118.

The test points 104 may implement multi-phase (e.g., three-phase) line-side non-contact or high-impedance touch-test-point voltage test stations. Each test station 104 may be operational to provide test voltages indicative of the voltage on a corresponding line-side power supply line (e.g., phase-to-phase voltages and/or phase-to-ground voltages). The test stations 104 may be configured to provide electrical isolation between the line-side power supply lines and contact points on the exterior of the test stations 104. In some embodiments, the test stations 104 may be mounted in the door 118.

The indicators 106 may implement multi-phase (e.g., three-phase) load-side voltage indicators. Each load-side voltage indicator 106 may be operational to illuminate while electrical power is present on a corresponding load-side power supply line. If electrical power is absent from any one or more of the load-side power supply lines, the corresponding load-side voltage indicator 104 may be dark. In some embodiments, the line-side voltage indicators 106 may be mounted in the door 118.

The test points 108 may implement multi-phase (e.g., three-phase) load-side non-contact or high-impedance touch-test-point voltage test stations. Each test station 108 may be operational to provide test voltages indicative of the voltage on a corresponding load-side power supply line (e.g., phase-to-phase voltages and/or phase-to-ground voltages). The test stations 108 may be configured to provide electrical isolation between the load-side power supply lines and contact points on the exterior of the test stations 108. In some embodiments, the test stations 108 may be mounted in the door 118.

The light 110 may implement a status light for low-voltage. The status light 110 may be visible from the exterior of the enclosure 101. The status light 110 may be illuminated while a low-voltage power is present inside the enclosure 101. The status light 110 may be dark while the low-voltage power is absent from inside the enclosure 101. In various embodiments, the status light 110 may be mounted in the door 118.

The lever 112 may implement a control power disconnect lever (also referred to as a manual switch). In some embodiments, the lever 112 may be a fused control power disconnect lever. The control power disconnect lever 112 is generally operational to switch electrical supply power to a power converter that generates one or more lower voltages (e.g., 120 volts AC single-phase power and/or 24 volt DC power). While the control power disconnect lever 112 is in an "on" position, the electrical power may be transferred from a power line to the power converter inside the isolated control panel 100. While the control power disconnect lever 112 is in an "off" position, the electrical power may be isolated from the power converter.

The window 114 may implement an explosion proof front viewing window. The window 114 may provide a view of the interior of the enclosure 101. In various embodiments, the front window 114 may be positioned on the door 118 to show a front view of a main power disconnect switch. Other locations of the window 114 may be implemented to meet the design criteria of a particular application.

The window 116 may implement an explosion proof side viewing window. The side window 116 may provide another view of the interior of the enclosure 101 from a different angle than the window 114. In various embodiments, the side window 116 may be positioned on a side of the enclosure 101 to show a side view of the main power disconnect switch. Other locations of the window 116 may be implemented to meet the design criteria of a particular application.

The hinges 120a-120b may be configured to pivotally attach the door 118 to the enclosure 101. While two hinges 120a-120b are illustrated, other numbers of hinges may be implemented. In some embodiments, a single piano-style hinge may be used to secure the door 118 to the enclosure 101.

The lever 122 may implement a door lever. The lever 122 is generally operational to hold the door 118 shut while the door 118 is closed and the lever 122 is in a "closed" position. While the lever 122 is in an "open" position, the door 118 may be free to rotate about the hinges 120a-120b, if safety interlocks permit.

The circuit 124 may implement one or more low-voltage (e.g., 120 volt AC) receptacles. The receptacles 124 may receive single-phase electrical power from the power converter. While electrical power is present in the power converter, a power line may transfer the electrical power (e.g., 120 volt AC power) through a power line to the receptacles 124. One or more of the receptacles 124 may be mounted on a side surface (as illustrated), top surface and/or bottom surface of the enclosure 101 and may be accessible from outside the enclosure 101. In various embodiments, one or more receptacles 124 may be mounted in the door 118. In some embodiments, one or more receptacles 124 may be mounted inside the enclosure 101.

Figure 2:
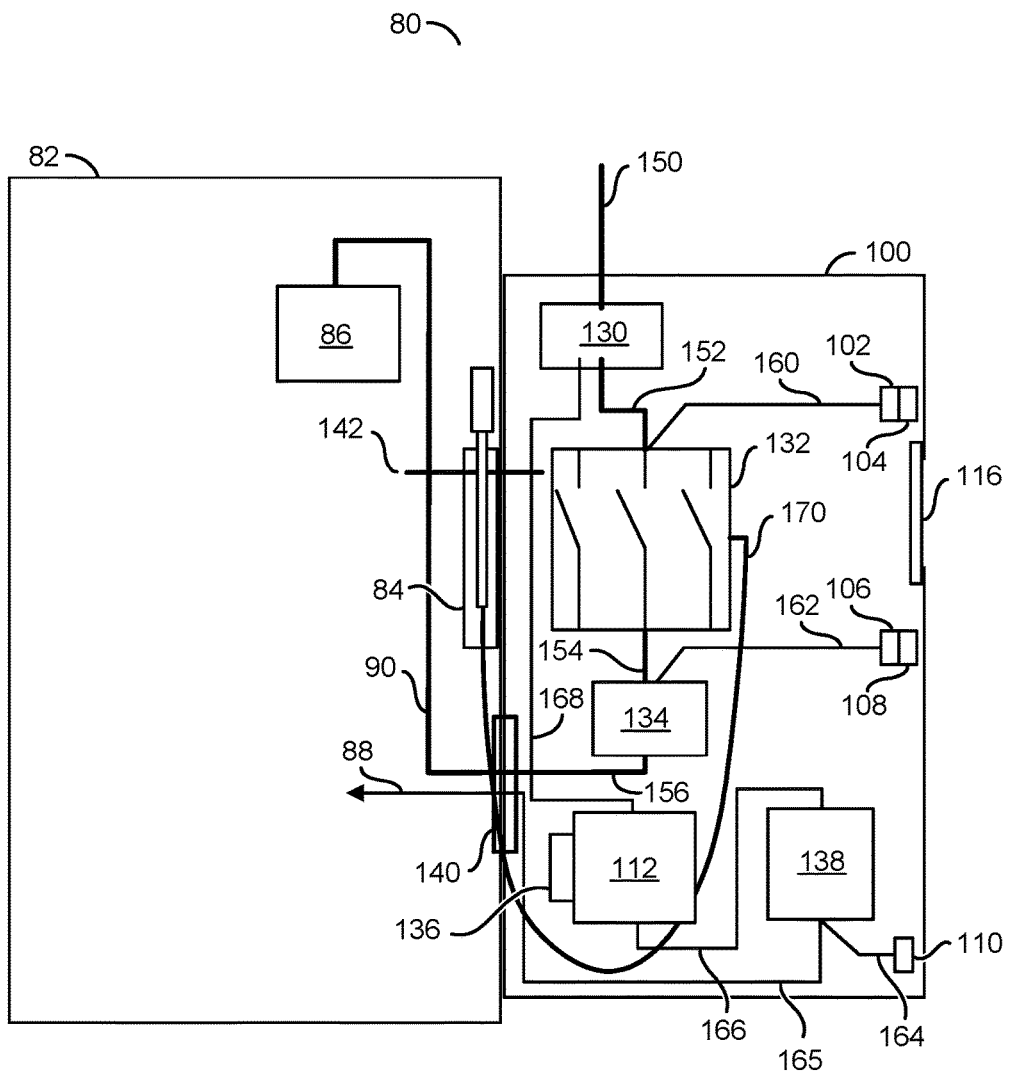
FIG. 2 is a block diagram of the system in accordance with an embodiment of the invention.

Referring to FIG. 2, a block diagram of an example implementation of the system 80 is shown in accordance with an embodiment of the invention. The industrial control panel 82 generally includes the main power disconnect handle 84, a branch circuit protector 86, a low-voltage wire 88 and a power line 90. The isolated control panel 100 generally includes the line-side voltage indicators 102, the line-side test station 104, the load-side voltage indicators 106, the load-side test station 108, the status light 110, the control power disconnect lever 112, the front window 114 and the side window 116. The isolated control panel 100 may also comprise a block (or circuit) 130, a block (or circuit) 132, a block (or circuit) 134, an interlock device (or mechanism) 136, one or more blocks (or circuits) 138, an interlock device (or mechanism) 142, a power line (or wire) 150, a power line (or wire) 152, a power line (or wire) 154, a power line (or wire) 156, a power line (or wire) 160, a power line (or wire) 162, a power line (or wire) 164, a power line (or wire) 165, a power line (or wire) 166, and a cable actuator (or link) 170.

The circuit 130 may implement a line-side power distribution block. The line-side power distribution block 130 is generally operational to distribute multiple-phase (e.g., three-phase) line-side electrical power from the multi-phase power line 150 to the circuit 132. The electrical power may be transferred from the line-side power distribution block 130 to the block 132 via the multi-phase power line 152. In various embodiments, the line-side power distribution block 130 may also distribute single-phase electrical power to the control power disconnect lever 112 via the power line 168. The current available on the power lines 150, 152 and 168 may be a hazardous available fault current.

The circuit 132 may implement a main power disconnect switch (also referred to as a power switch). The main power disconnect switch 132 is generally operational to alternately connect and disconnect the multi-phase electrical power received from the line-side power distribution block 130 to the circuit 134 via the power line 154. The main power disconnect switch 132 may be controlled by the cable actuator 170. In some embodiments, the power lines 150 and 168 may be connected directly to the main power disconnect switch 132 and the line-side power distribution block 130 may be eliminated. The multi-phase electrical power received by the main power disconnect switch 132 may also be transferred to the line-side voltage indicator 102 and the line-side test station 104 via the multi-phase power line 160.

The circuit 134 may implement a load-side power distribution block. The load-side power distribution block 134 is generally operational to distribute multiple-phase (e.g., three-phase) load-side electrical power received from the main power disconnect switch 132 to the industrial control panel 82 via the multi-phase power line 156. The electrical power from the output side of the load-side power distribution block 134 may be connected to the branch circuit protector 86, located in the industrial control panel 82. The power line 156 may pass through one or more apertures 140 in the walls of the isolated control panel 100 and continue in the industrial control panel 82 as the power line 90. The power line 90 is generally connected to the branch circuit protector 86. The multi-phase electrical power received by the load-side power distribution block 134 may also be transferred to the load-side voltage indicator 106 and the load-side test station 108 via the multi-phase power line 162.

The interlock device 136 is generally operational to keep the door 118 in the closed position while the control power disconnect lever 112 is in the "on" position. While the control power disconnect lever 112 is in the "off" position, the interlock device 136 may allow the door 118 to be open, if the door lever 122 and the interlock device 142 permit.

Each circuit 138 may implement a power converter circuit (one shown for clarity). Each power converter 138 is generally operational to convert single-phase electrical power received from the control power disconnect lever 112 into low-voltage electrical power (e.g., 24 volts DC power or 120 volts AC power). The single-phase electrical power may be transferred via the power line 166. In some embodiments, a single power converter 138 may be implemented. In other embodiments, multiple (e.g., 2) power converters 138 may be implemented, each generating the same type or a different type of low-voltage electrical power.

Single-phase electrical power may be received by the power converter 138 from the line-side power distribution block 130 through the control power disconnect lever 112. While the control power disconnect lever 112 is in the "on" position, electrical power may be supplied from the line-side power distribution block 130, through power line 168, through the control power disconnect lever 112, and through the power line 166 to the power converter 138. While the control power disconnect lever 112 is in the "off" position, no electrical power is provided to the power converter 138.

The low-voltage power may be presented by the power converter 138 on the power lines 164 and 165 while electrical power is received on the power line 166. The power line 164 may transfer the low-voltage power to the status light 110. The power line 165 may transfer the low-voltage power through one or more of the apertures 140 where the line continues inside the industrial control panel 82 as the low-voltage wire 88.

The apertures 140 may be implemented as gasketed apertures. The apertures 140 are generally configured to provide passage between an interior of the industrial control panel 82 and an interior of the isolated control panel 100. The apertures 140 may convey multiple power lines/wires and the cable actuator 170.

The interlock device 142 is generally configured to prevent the door 118 of the isolated control panel 100 and/or a door of the industrial control panel 82 from opening when the main power disconnect handle 84 is in the "on" position. The interlock device 142 may be defeatable with a standard tool. The interlock device 142 may also prevent the main power disconnect handle 84 from moving from the "off" position to the "on" position when the door 118 of the isolated control panel 100 and/or the door of the industrial control panel 82 is open. The locking feature of the interlock device 142 with the main power disconnect handle 84 may also be defeatable with a standard tool.

The cable actuator 170 generally provides a mechanical link between the main power disconnect switch 132, located inside the isolated control panel 100, and the main power disconnect handle 84, located on the industrial control panel 82. The cable actuator 170 may be connected such that operating the main power disconnect handle 84 also operates the main power disconnect switch 132 in a synchronic manner. The cable actuator 170 may pass between the isolated control panel 100 and the industrial control panel 82, through at least one of the apertures 140.

Figure 3:
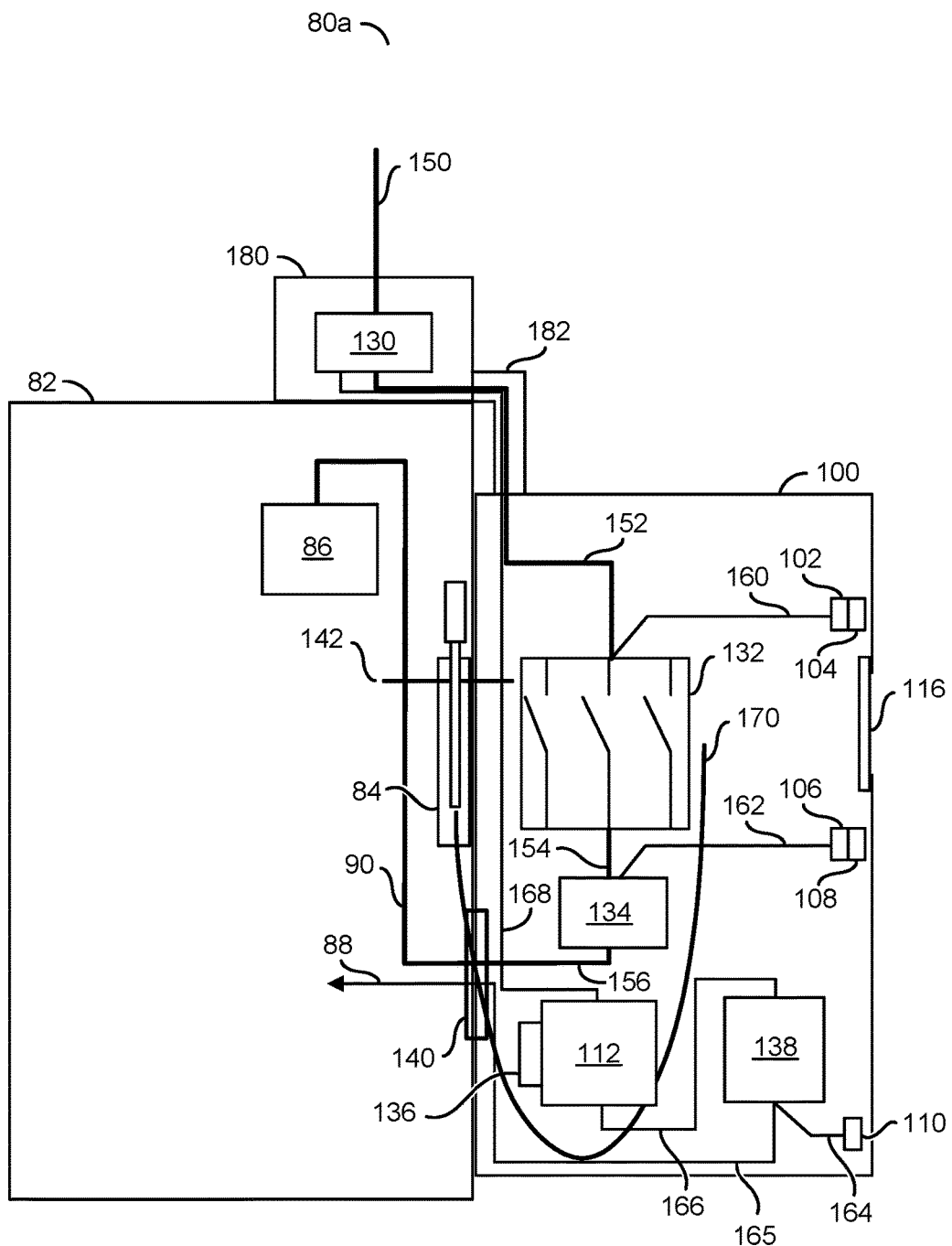
FIG. 3 is a block diagram of a variation of the system.

Referring to FIG. 3, a block diagram of another example implementation of a system 80a is shown. The system 80a may be a variation of the system 80. The system 80a generally comprises the system 80 with an additional enclosure (or housing) 180 and a conduit 182. The line-side power distribution block 130 may be mounted in the enclosure 180.

The enclosure 180 may be mounted to a top of the industrial control panel 82. The multi-phase power line 150 may be received by the line-side power distribution block 130. The ridged conduit 182 may convey the multi-phase power line 152 from the line-side power distribution block 130 to the main power disconnect switch 132. The conduit 182 may also convey the power line 168 from the line-side power distribution block 130 to the control power disconnect lever 112.

Figure 4:
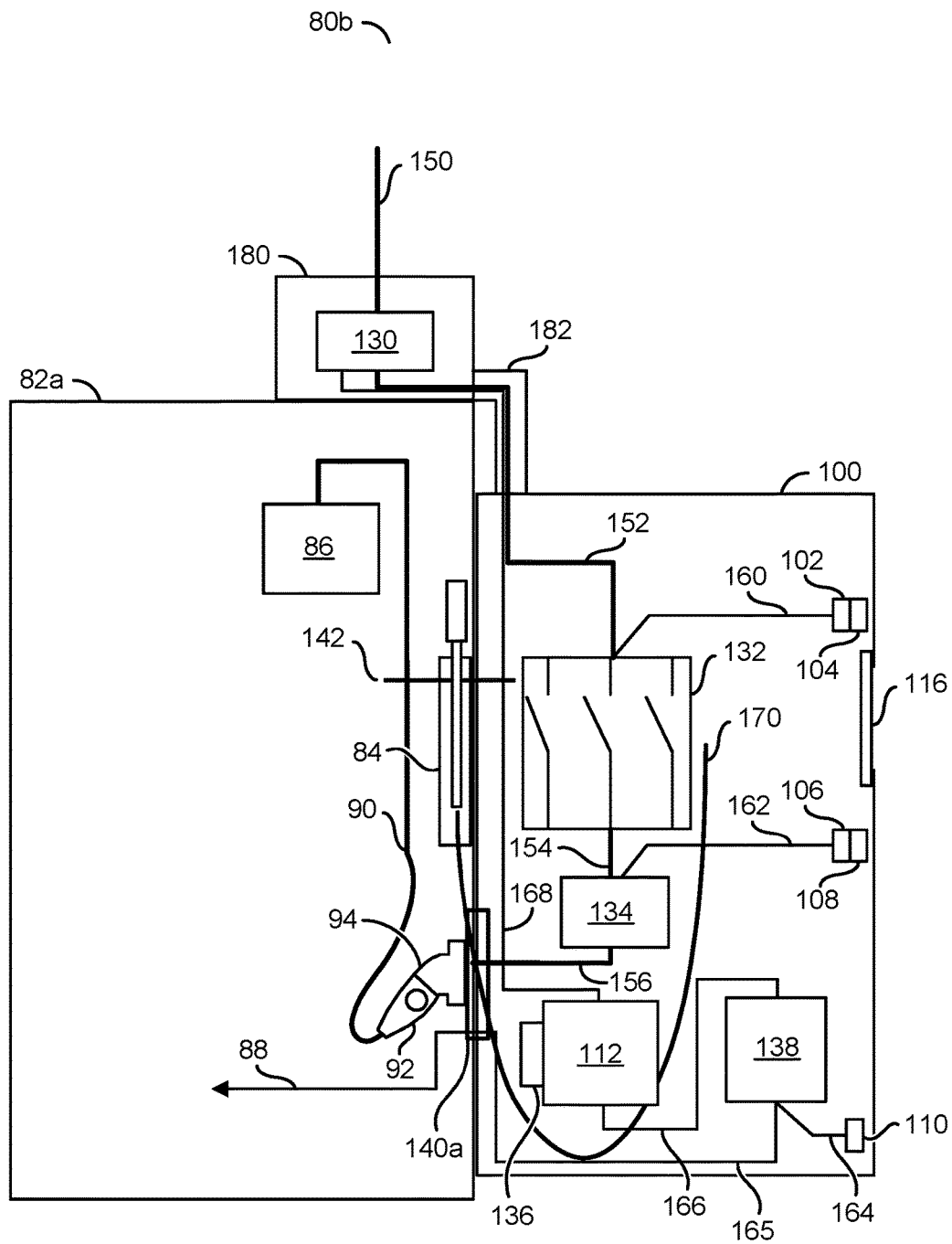
FIG. 4 is a block diagram of another variation of the system.

Referring to FIG. 4, a block diagram of another example implementation of a system 80b is shown. The system 80b may be a variation of the system 80a with a modified industrial control panel 82a. The power from the output side of the load-side power distribution block 134 may be connected to the branch circuit protector 86 located in the industrial control panel 82a, as in the system 80a. The multi-phase power line 156 generally passes through the one or more apertures 140a of the isolated control panel 100 and the industrial control panel 82a. The apertures 140a may transfer the electrical power to the power line 90 through the use of a rated disconnect plug 92 and a corresponding receptacle 94.

Figure 5:
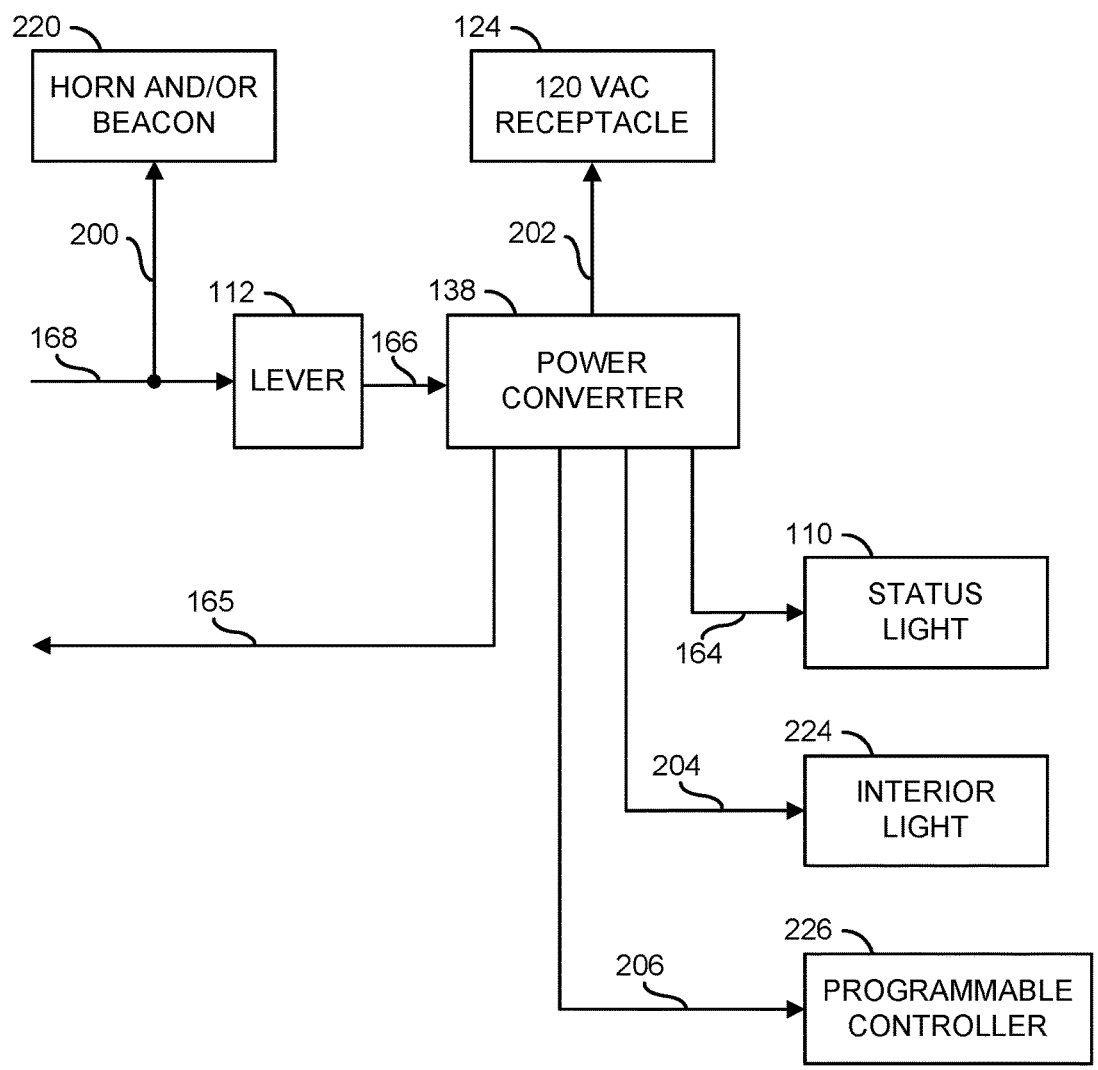
FIG. 5 is a block diagram of a portion of an isolated control panel.

Referring to FIG. 5, a block diagram of an example implementation of a portion of the isolated control panel 100 is shown. The isolate control panel 100 may include the status line 110, the receptacles 124, the power converter 138, a block (or circuit) 220, a block (or circuit) 224 and a block (or circuit) 226. The isolated control panel 100 may also include a power line (or wire) 200, a power line (or wire) 202, a power line (or wire) 204 and a power line (or wire) 206.

The circuit 220 may implement a horn and/or a beacon. The horn/beacon may be operational to trigger while the door 118 is open and electrical power is present on the line-side power distribution block 130. While electrical power is present on the line-side power distribution block 130, the power line 168 may transfer the electrical power to the power line 200 and to the horn/beacon 220. A power line 202 may provide electrical power from the power converter 138 to the receptacles 124.

The circuit 224 may implement a light on the interior of the enclosure 101. The interior light 224 may be powered from the power converter 138 via the power line 204. The interior line 224 may include an exterior on/off switch that enables the interior light 224 to be switched on when desired, and off when not in use.

The circuit 226 may implement a programmable controller. The programmable 226 may be operational to monitor various auxiliary signals inside the enclosure 101 and report the status of the auxiliary signals to a remote monitoring station. The programmable controller 226 may be powered by the power converter 138 through the power line 206.

Figure 6:
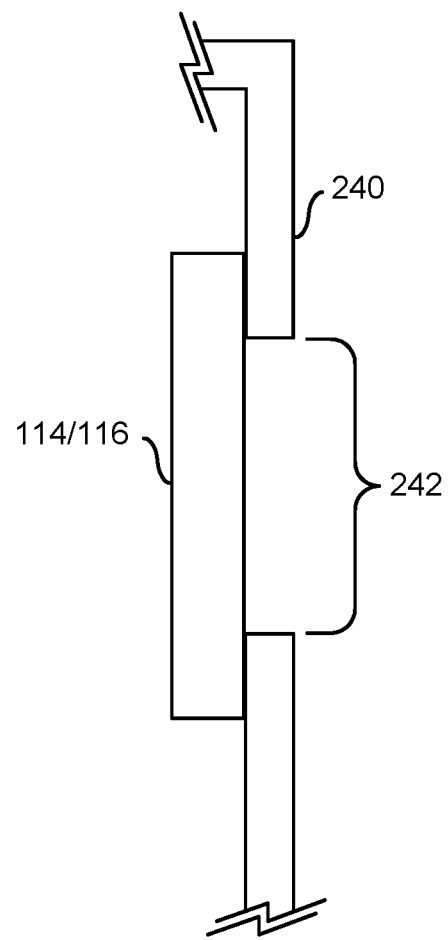
FIG. 6 is a diagram of a mounting for a window.

Referring to FIG. 6, a diagram of an example mounting of a window is shown. The window illustrated may be representative of the front window 114 and/or the side window 116. A wall 240 of the isolated control panel 100 may include an opening 242 for each window. For the front window 114, the opening 242 may be formed in the door 118. For the side window 116, the opening 242 may be formed in the enclosure 101. In some embodiments, the opening 242 may be generally rectangular in shape. Other shapes of openings may be implemented to meet the design criteria of a particular application. Each window 114/116 may be mounted on an interior side of the wall 240. Any pressure created by an arc-flash and/or arc-blast inside the isolated control panel 100 generally forces the windows 114 and 116 against the wall 240, thereby containing the pressure and preventing an electrical worker (or operator or person) and/or bystander from being exposed to the blast.

Figure 7:
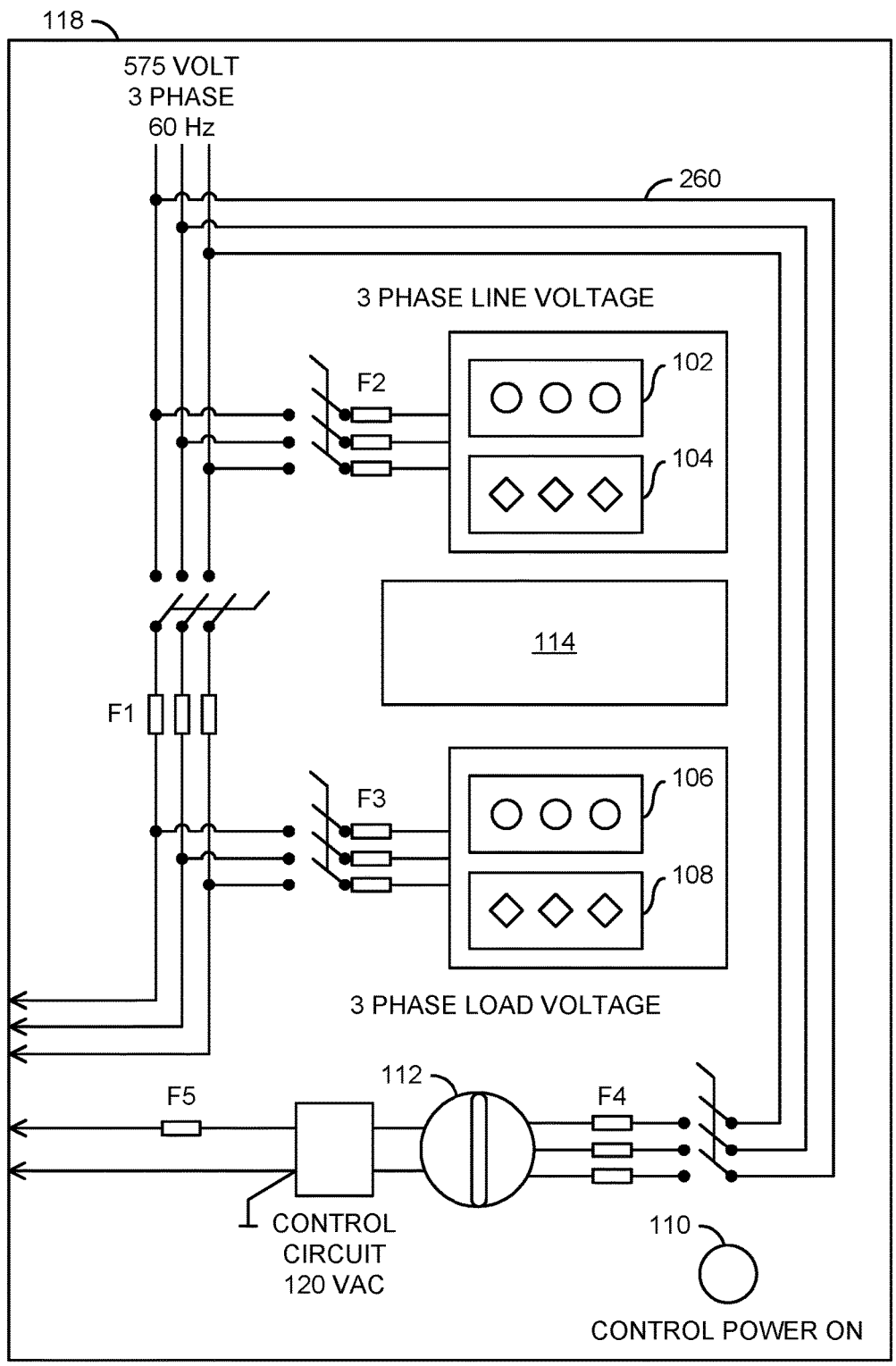
FIG. 7 is a diagram of a door sticker.

Referring to FIG. 7, a diagram of an example implementation of a sticker located on an exterior side of the door 118 is shown. The sticker may include a schematic (or wiring diagram) 260 of the electrical power routing, fuses (e.g., F1, F2, F3 and F4), and switches included in the isolated control panel 100. The schematic 260 generally allows the electrical worker to see how the electrical power is routed from the top of the isolated control panel 100 (e.g., 575 volt 3-phase 60 Hertz line-side electrical power) to the electrical power transferred to the industrial control panel 82 at the lower lefthand side of the schematic 260.

Figure 8:
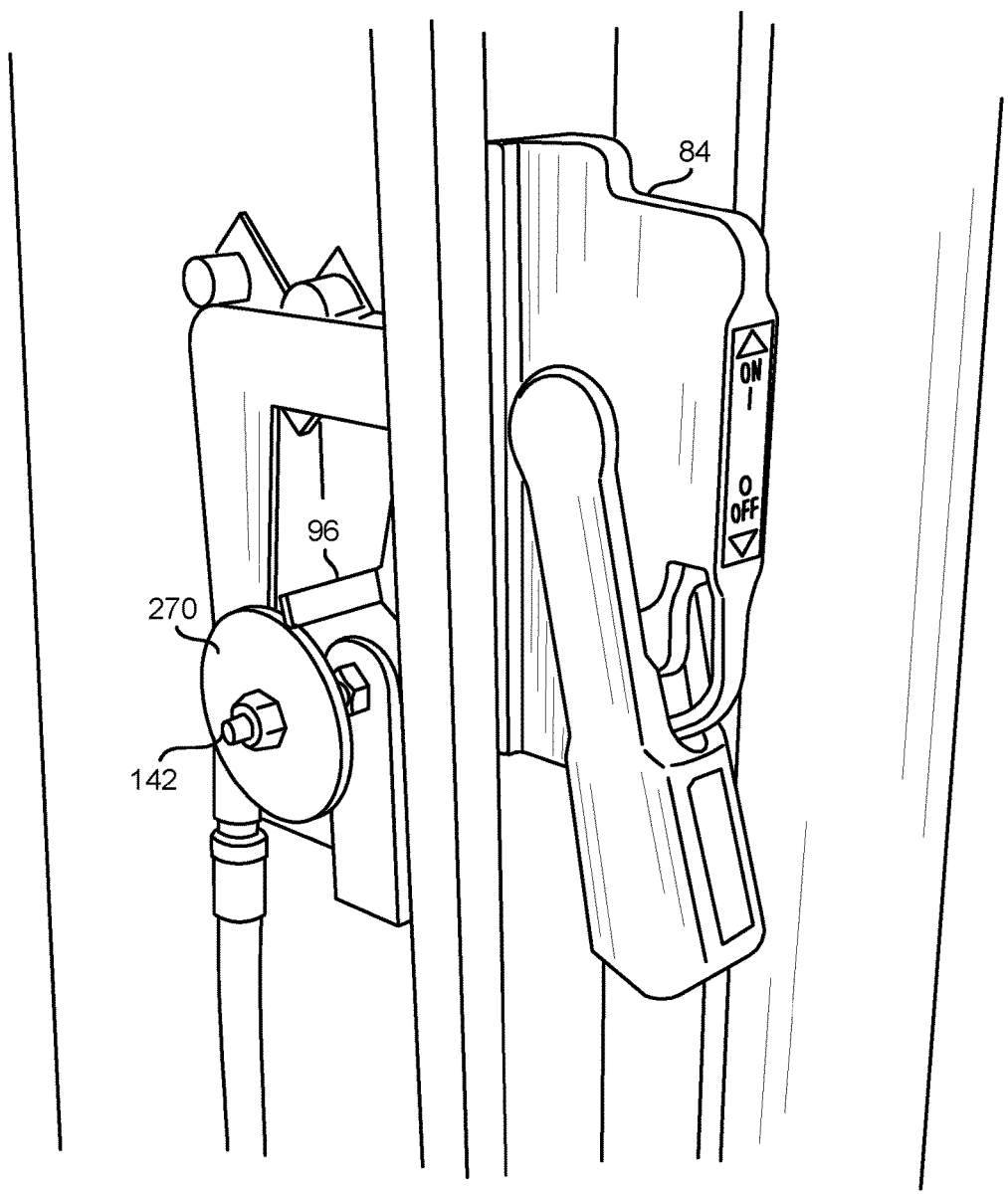
FIG. 8 is a perspective diagram of a portion of an interlock device within the industrial control panel.

Referring to FIG. 8, a perspective diagram of an example implementation of a portion of the interlock device 142 within the industrial control panel 82 is shown. The interlock device 142 may include a disk 270. While the door 118 of the isolated control panel 100 is open, the disk 270 may be biased by a spring to reside in the path of a defeater lever 96 of the main power disconnect handle 84. As shown, the disk 270 may reside in a "de-energized" position that prevents the defeater lever 96 from being moved downward. With the defeater lever 96 in an upward position, as shown, the main power disconnect handle 84 cannot be moved from the "off" position to the "on" position. The disk 270 may prevent the main electrical power from being turned on inside the industrial control panel 82 and inside the isolated control panel 100 on the load side past the main power disconnect switch 132.

Figure 9:
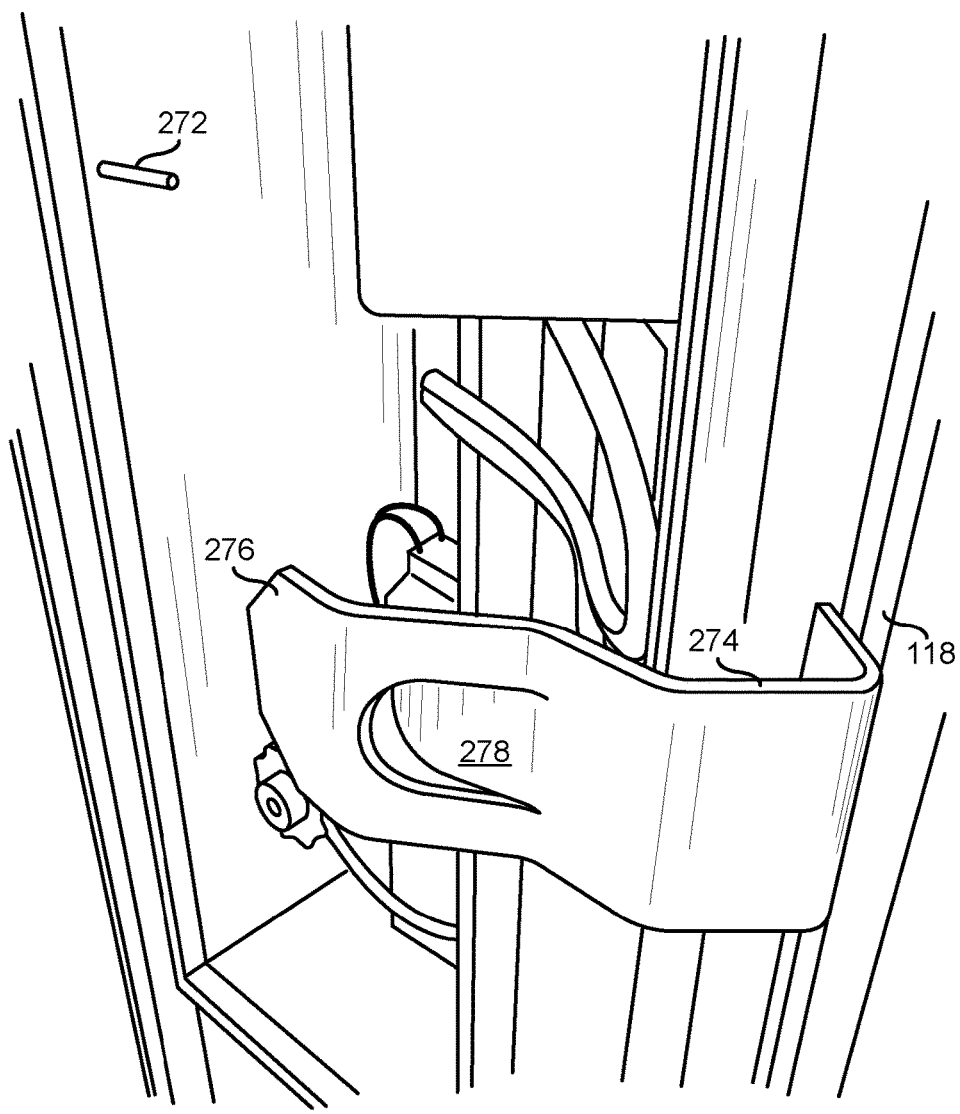
FIG. 9 is a perspective diagram of a portion of the interlock device within the isolated control panel.

Referring to FIG. 9, a perspective diagram of a portion of the interlock device 142 within the isolated control panel 100 is shown. The interlock device 142 may further include a rod 272 attached to the disk 270, and a latch 274 attached to the door 118. With the door 118 open, as shown, the rod 272 and disk 270 are biased toward the isolated control panel 100 and may prevent the defeater lever 96 from being moved downward.

As the door 118 of the isolated control panel 100 is closed, a flange 276 of the latch 274 may engage a free end of the rod 272. As the door 118 continues to close, the flange 276 generally pushes the rod 272 and disk 270 toward the industrial control panel 82 (e.g., to the left as illustrated) to an "intermediate" position. The movement caused by the flange 276 may be sufficient to cause the disk 270 to disengage the defeater lever 96.

When door 118 reaches a fully closed position, the rod 272 may fall into a slot 278 of the latch 274. With the rod 272 in the slot 278, the disk 270 may be in an "energized" position and remain disengaged from the defeater lever 96. The electrical work may now switch the main power disconnect handle 84 from the "off" position to the "on" position by causing the defeater lever 96 to move downward with a tool. With the main power disconnect handle 84 in the "on" position, the cable actuator 170 may close the main power disconnect switch causing the multi-phase electrical power to flow into the industrial control panel 82 from the isolated control panel 100.

The slot 278 may be shaped to interfere with the rod 272 while the door 118 is in the closed position. Any attempt to open the door 118 with the interlock device 142 in the "energized" position may be blocked by the rod 272 striking against the latch 274. The interlock device 142 generally prevents the door 118 from being opened if the main power disconnect handle 84 is in the "on" position or in the "off" position.

To return the interlock device 142 to the "de-energized" position, the electrical worker generally opens the industrial control panel 82 and pulls the disk 270 away from the isolated control panel 100 to the "intermediate" position. While the disk 270 is in the "intermediate" position, the door 118 of the isolated control panel 100 may be opened by the operator. Once the latch 274 is clear of the rod 272, the operator may release the disk 270, allowing the disk 270 to be biased back into the "de-energized" position by the spring.

Figure 10:
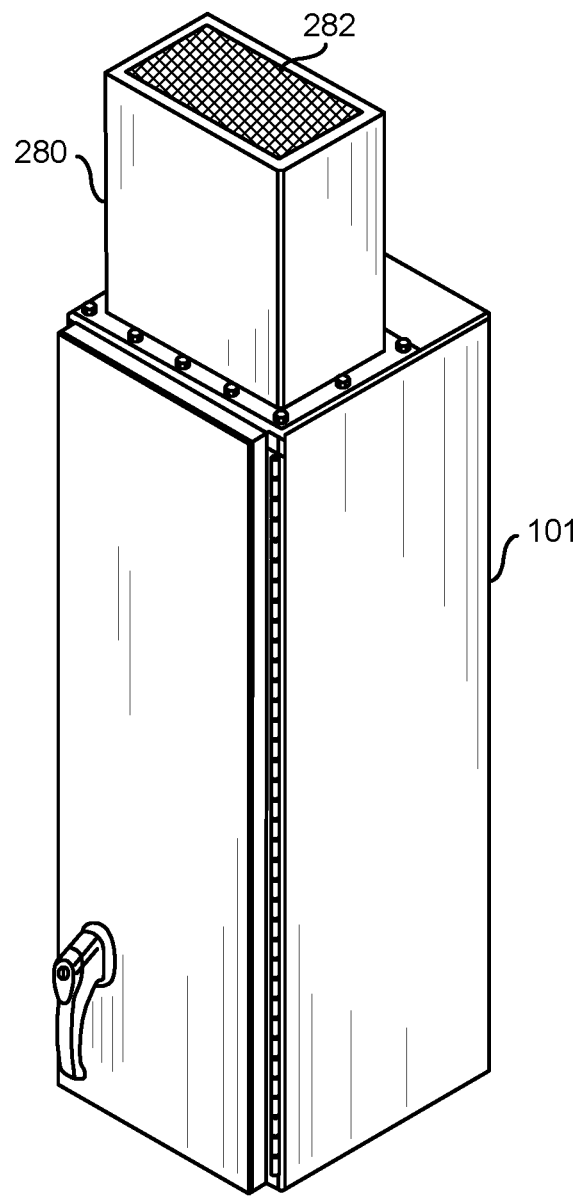
FIG. 10 is a perspective diagram of a relief chamber.

Referring to FIG. 10, a perspective diagram of an example implementation of a relief chamber 280 is shown. The relief chamber 280 may be attached to a side (e.g., a top side) of the enclosure 101 over an opening in the wall of the enclosure 101. An end of the relief chamber 280 furthest from the enclosure 101 may include a screen area 282. The screen area 282 is generally designed to allow hot gasses and flames from an arc-flash and/or arc-blast to pass through of the relief chamber 280 out into the surrounding atmosphere in a predetermined direction. The screen area 282 is generally oriented such that the hot gasses and flames are directed away from an area in front of the door 118 where the electrical worker is commonly standing.

Figure 11:
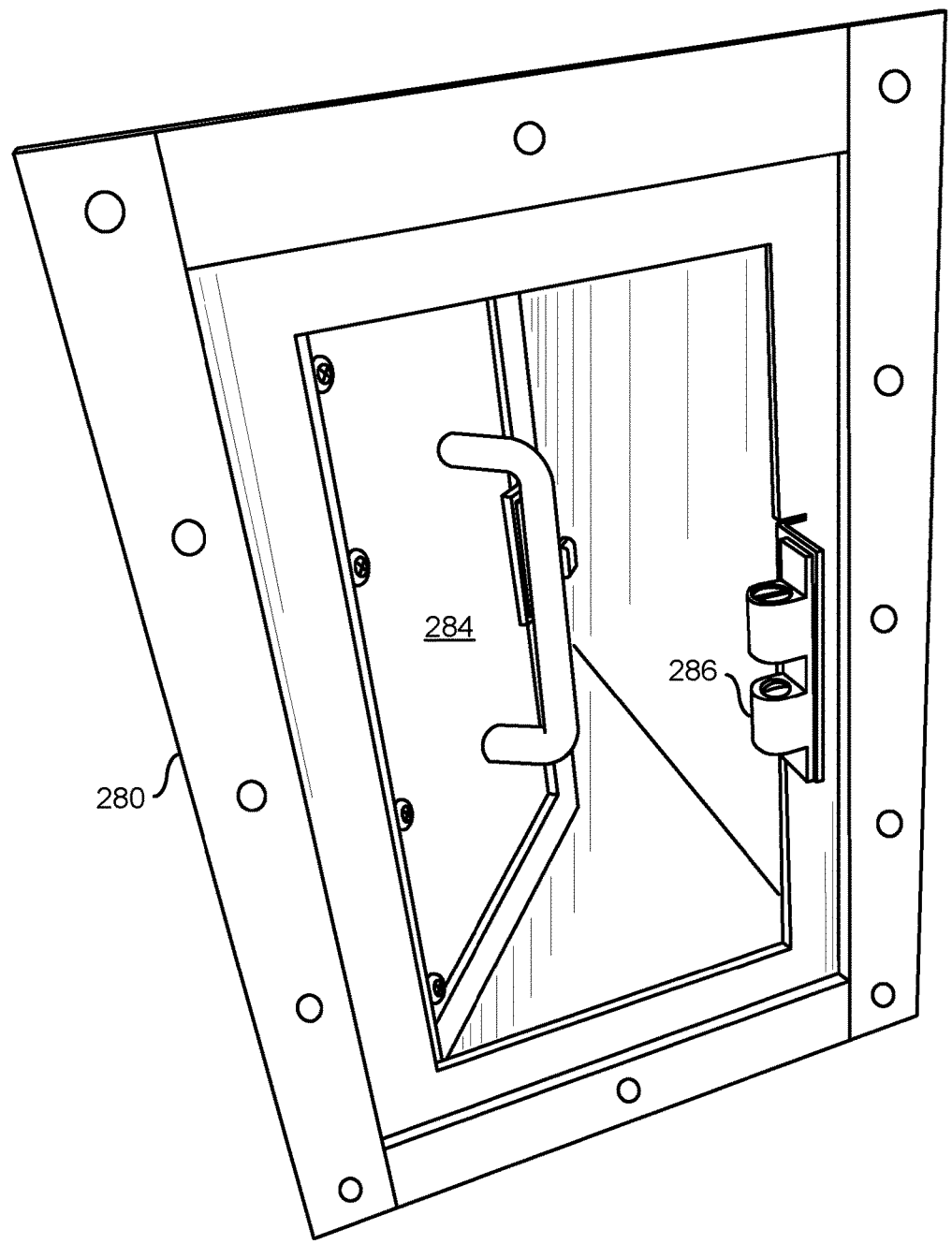
FIG. 11 is a perspective diagram of the relief chamber from an enclosure side.

Referring to FIG. 11, a perspective diagram of the relief chamber 280 from the enclosure 101 side is shown. The relief chamber 280 generally includes a door 284 and a latch 286. The door 284 may be hinged to swing into an interior of the relief chamber 280. The door 284 may include a handle. The latch 286 is generally configured to hold the door 284 in a closed position.

In normal use, the latch 286 generally holds the door 284 in the closed position. The closed door 284 may keep the interior of the isolated control panel 100 sealed from the outside environment. When an over-pressure situation from an arc-flash and/or arc-blast occurs, the pressure may push against the door 284. The latch 286 is generally configured to release the door 284 when a specified pressure is reached. For example, the latch 286 may release when approximately 30 to 60 pounds per square inch of pressure is exerted (e.g., from a 2,000 ampere arc at 4 inches away). The pressure may push the door 284 open allowing the hot gases and/or flames to pass into the relief chamber 280 and subsequently out through the screen area 282.

Figure 12:
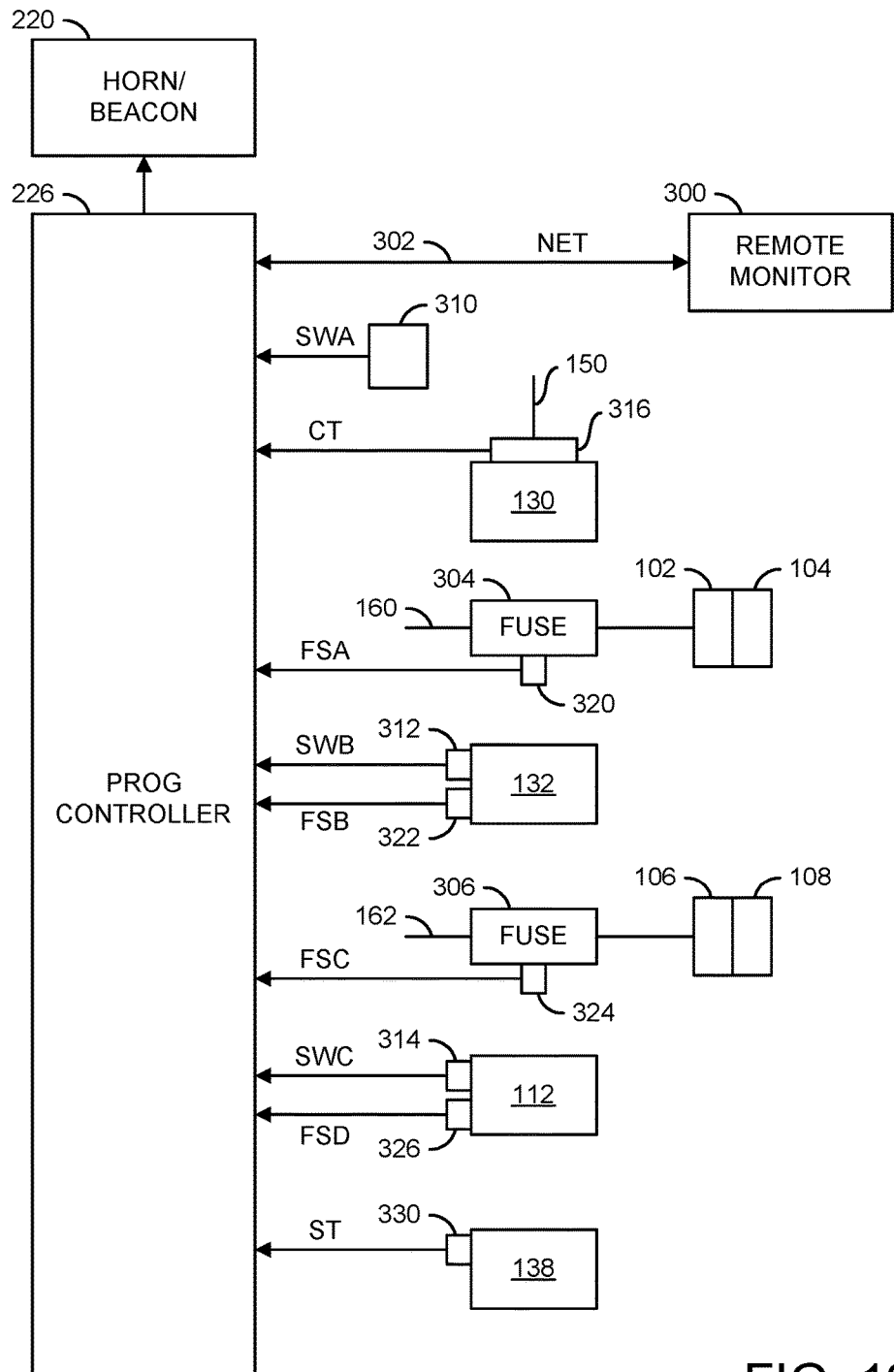
FIG. 12 is a block diagram of a remote monitoring configuration.

Referring to FIG. 12, a block diagram of an example remote monitoring configuration is shown. All or some of the devices inside the isolated control panel 100 may be fitted with auxiliary signaling components (or sensors) that receive low-voltage electrical power. Each auxiliary signaling component may provide one or more sensor signals to the programmable controller 226. The programmable controller 226 generally monitors the status of each signal to determine a status of each corresponding device. The status of the devices may be pushed by the programmable controller 226 to a remote monitor 300 outside the isolated control panel 100. Bidirectional communication between the programmable controller 226 and the remote monitor 300 may be provided via a network (or communication channel) 302. In various embodiments, the network 302 may be implemented as a wired network and/or a wireless network. In some implementations, the network 302 may include, but is not limited to, an Ethernet network, a Wi-Fi network or a cellular network. Other networks may be implemented to meet the design criteria of a particular application.

The remote monitor 300 may be a standard information technology (IT) system so that any outside entity may monitor and track such things as maintenance work (downtime), a circuit protector failure, an open door alarm, power consumption, etc. The programmable controller 226 may also be used for local annunciation. For example, the programmable controller 226 may control the horn/beacon 220 based on signals received from the auxiliary signaling components.

The isolated control panel 100 may include a fuse (or circuit breaker) 304 on the power line 160 and a fuse (or circuit breaker) 306 on the power line 162. The auxiliary signaling components generally comprise a sensor (or switch) 310, a sensor (or switch) 312, a sensor (or switch) 314, a sensor (or monitor) 316, a sensor (or monitor) 320, a sensor (or monitor) 322, a sensor (or monitor) 324, a sensor (or monitor) 326 and a sensor (or monitor) 330.

A signal (e.g., SWA) may be generated by the sensor 310 and received by the programmable controller 226. The signal SWA may carry door 118 open/closed information. A signal (e.g., SWB) may be generated by the sensor 312 and received by the programmable controller 226. The signal SWB may carry switch open/closed information for the main power disconnect switch 132. A signal (e.g., SWC) may be generated by the sensor 314 and received by the programmable controller 226. The signal SWC may carry switch open/closed information for the control power disconnect lever 112.

A signal (e.g., CT) may be generated by the sensor 316 and received by the programmable controller 226. The signal CT generally conveys current information for the electrical power entering the line-side power distribution block 130. A signal (e.g., FSA) may be generated by the sensor 320 and received by the programmable controller 226. The signal FSA may carry fuse status information for the fuse 304. A signal (e.g., FSB) may be generated by the sensor 322 and received by the programmable controller 226. The signal FSB may carry fuse status information for the main power disconnect switch 132. A signal (e.g., FSC) may be generated by the sensor 324 and received by the programmable controller 226. The signal FSC may carry fuse status information for the fuse 306. A signal (e.g., FSD) may be generated by the sensor 326 and received by the programmable controller 226. The signal FSD may carry fuse status information for the control power disconnect lever 112. A signal (e.g., ST) may be generated by the sensor 330 and received by the programmable controller 226. The signal ST may carry status information for the power converter 138.

The sensor 310 may implement a door switch configured to report an open/closed condition of the door 118 in the signal SWA. The sensor 312 may implement one or more switches configured to report an open/closed condition of the switches of the main power disconnect switch 132 in the signal SWB. The sensor 314 may implement a switch configured to report an open/closed condition of the control power disconnect lever 112 in the signal SWC. Other switch sensors may implemented to meet the design criteria of a particular implementation.

The sensor 320 may implement a fuse status sensor configured to report an open/closed condition of the fuse 304 in the signal FSA. The sensor 322 may implement one or more fuse status sensors configured to report an open/closed condition of the fuses of the main power disconnect switch 132 via the signal FSB. The sensor 324 may implement a fuse status sensor configured to report an open/closed condition of the fuse 306 in the signal FSC. The sensor 326 may implement a fuse status sensors configured to report an open/closed condition of a fuse of the control power disconnect lever 112 via the signal FSD.

The sensor 316 may implement multiple (e.g., three) current toroid sensors. Each of the current toroid sensor 316 may be configured to report a current flow in a corresponding phase of the power line 150 in the signal CT. The sensor 330 may implement a power converter status sensor. The power converter status sensor 330 is generally operational to report a health of the power converter 138 in the signal ST. Other types of sensors may be implemented to meet the design criteria of a particular application.

Figure 13:
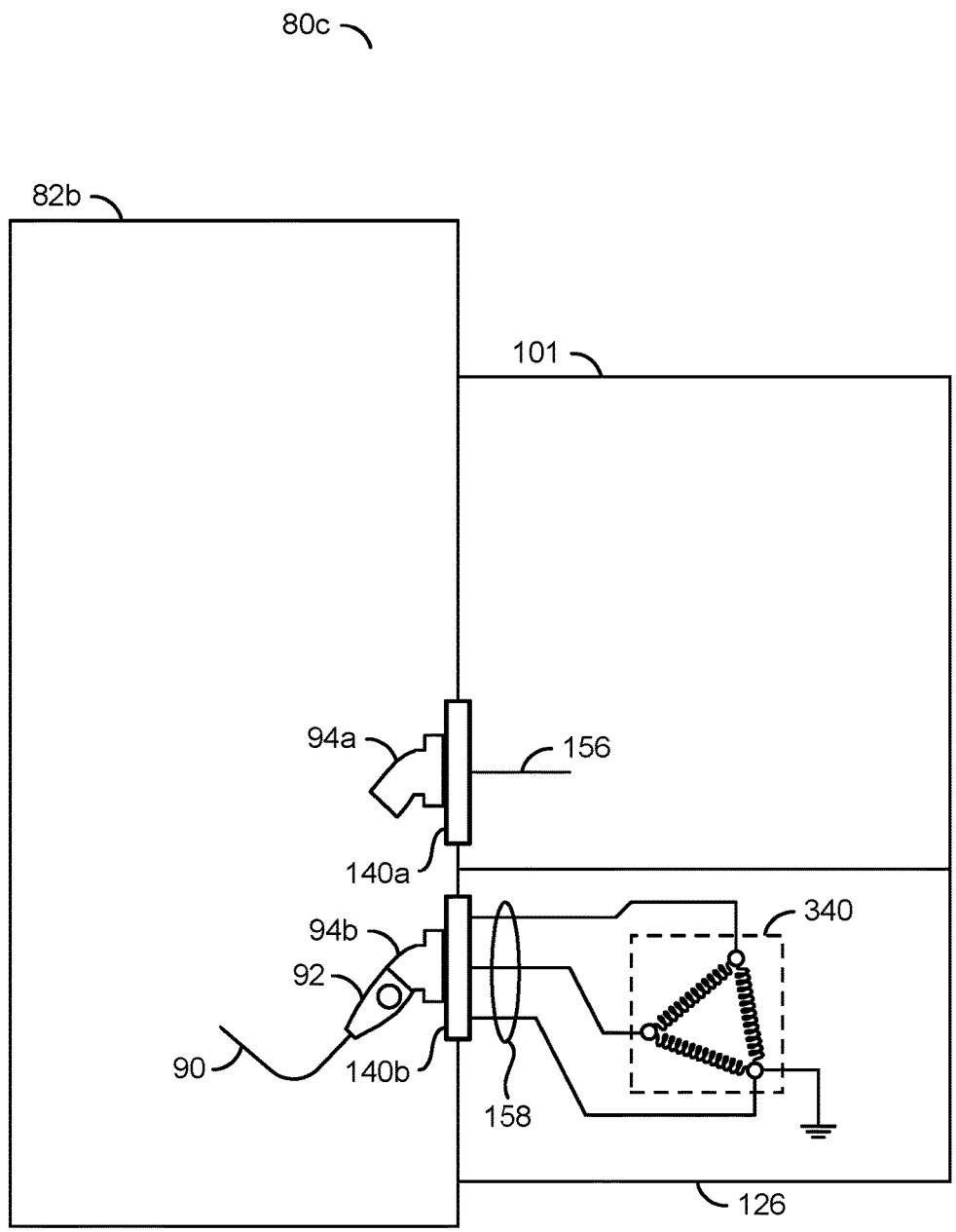
FIG. 13 is a block diagram of another variation of the system.

Referring to FIG. 13, a block diagram of another example implementation of a system 80*c* is shown. The system 80*c* may be a variation of the system 80*b* with a modified industrial control panel 82*b* and an extended enclosure 126. The extended enclosure 126 may be mounted below (as illustrated), above or to a side of the enclosure 101. The extended enclosure 126 generally comprises a power line (or wires) 158 and a resistor bank 340. The receptacle 94 in the industrial control panel 82*a* (FIG. 4) may be duplicated as a receptacle 94*a* and a receptacle 94*b* in the industrial control panel 82*b*.

The receptacle 94*a* may be connected to the power line 156 through the apertures 140*a* to receive multi-phase electrical power from the isolated control panel 100. The receptacle 94*b* may be connected to the resistor bank 340 through the apertures 140*b* and the power line 158. The resistor bank 340 generally comprises multiple (e.g., three) high-power resistors connected between the phases on the power line 158.

While and the industrial control panel 82*b* is open, the rated disconnect plug 92 may be manually disconnected from the receptacle 94*a* and plugged into the receptacle 94*b*. The receptacle 94*b* generally connects the resistor bank 340 across the phases of the power line 90. The resistor bank 340 may discharge residual energy storage elements (e.g., capacitors or the like) present in the industrial control panel 82*b* making the interior of the industrial control panel 82*b* safe. Before closing the industrial control panel 82*b*, the disconnect plug 92 may be manually disconnected from the receptacle 94*b* and plugged into the receptacle 94*a*.

The functions and structures illustrated in the diagrams of FIGS. 1 to 13 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an enclosure comprising a door and one or more apertures, wherein said enclosure is mechanically attachable to an external side of an industrial control panel with said apertures aligned to one or more openings in a wall of said industrial control panel;
   a power switch mounted inside said enclosure and configured to switch electrical power from a line-side power line to a load-side power line, wherein said load-side power line is configured to transfer said electrical power through at least one of said apertures;
   a cable actuator configured to control said power switch and having (i) a first end configured to control said power switch and (ii) a second end connectable through one of said apertures to a power disconnect handle of said industrial control panel, wherein said power switch is (a) open while said power disconnect handle is in an off position and (b) closed while said power disconnect handle is in an on position;
   a power converter configured to generate low-voltage power from said electrical power;
   a manual switch mounted through said door and configured to switch said electrical power from a line side of said power switch to said power converter; and
   a wire configured to transfer said low-voltage power through at least one of said apertures.

2. The apparatus according to claim 1, further comprising an interlock device configured to prevent said door from opening while said industrial control panel is closed.

3. The apparatus according to claim 2, wherein said interlock device is further configured to prevent said power disconnect handle from moving from an off position to said on position while said door is open.

4. The apparatus according to claim 1, further comprising a viewing window in said enclosure configured to provide a view of said power switch.

5. The apparatus according to claim 4, further comprising another viewing window in said enclosure configured to provide another view of said power switch from a different angle than said viewing window.

6. The apparatus according to claim 1, further comprising a wiring diagram located on an exterior side of said door and configured to show a routing of said electrical power (i) through said power switch to said apertures and (ii) through said manual switch to said power converter.

7. The apparatus according to claim 1, further comprising a light (i) mounted on said door, (ii) viewable from outside said enclosure and (iii) configured to indicate a status of said low-voltage power.

8. The apparatus according to claim 1, further comprising a plurality of lights (i) mounted on said door, (ii) viewable from outside said enclosure and (iii) configured to indicate a status of each phase of said electrical power from a line-side power line.

9. The apparatus according to claim 1, further comprising a plurality of test points (i) mounted on said door, (ii) accessible from outside said enclosure and (iii) configured to present at least one of (a) a phase-to-phase voltage and (b) a phase-to-ground voltage from each phase of said electrical power from a line-side power line.

10. The apparatus according to claim 1, further comprising a plurality of lights (i) mounted on said door, (ii) viewable from outside said enclosure and (iii) configured to indicate a status of each phase of said electrical power from a load-side power line.

11. The apparatus according to claim 1, further comprising a plurality of test points (i) mounted on said door, (ii)

accessible from outside said enclosure and (iii) configured to present at least one of (a) a phase-to-phase voltage and (b) a phase-to-ground voltage from each phase of said electrical power from a load-side power line.

12. The apparatus according to claim 1, further comprising an additional enclosure (i) mountable to said industrial control panel and (ii) configured to route said electrical power to said enclosure.

13. The apparatus according to claim 1, further comprising an interlock device (i) connected to said manual switch and (ii) configured to prevent said door from opening while said manual switch is in an on position.

14. The apparatus according to claim 1, further comprising at least one of (i) a horn and (ii) a beacon configured to trigger while said door is open and said electrical power is present on said line-side power line.

15. The apparatus according to claim 1, further comprising a 120 volt AC receptacle configured to provide 120 volt power from line-side of said power switch.

16. The apparatus according to claim 1, further comprising a light (i) mounted inside said enclosure, (ii) powered by said low-voltage power and (iii) configured to illuminate said power switch.

17. The apparatus according to claim 1, further comprising a programmable controller (i) mounted inside said enclosure, (ii) powered by said low-voltage power and (iii) configured to report a plurality of sensor signals to a remote monitor external to said enclosure.

18. The apparatus according to claim 1, further comprising a resistor bank configured to discharge stored energy in said industrial control panel.

19. The apparatus according to claim 1, wherein said enclosure further comprises a relief chamber configured to direct at least one of (i) an arc-flash and (ii) an arc-blast out of said enclosure in a predetermined direction.

20. A method for risk reduction of electrical hazards, comprising the steps of:
  switching electrical power with a power switch from a line-side power line to a load-side power line inside an enclosure, wherein (i) said enclosure is mechanically attachable to an external side of an industrial control panel with one or more apertures of said enclosure aligned to one or more openings in a wall of said industrial control panel and (ii) said load-side power line is configured to transfer said electrical power from inside said enclosure through at least one of said apertures;
  controlling said power switch with a cable actuator having (i) a first end configured to control said power switch and (ii) a second end connectable through one of said apertures to a power disconnect handle of said industrial control panel, wherein said power switch is (a) open while said power disconnect handle is in an off position and (b) closed while said power disconnect handle is in an on position;
  generating low-voltage power from said electrical power with a power converter;
  switching said electrical power with a manual switch from a line side of said power switch to said power converter; and
  transferring said low-voltage power from inside said enclosure through at least one of said apertures.

* * * * *